United States Patent
Nakanishi et al.

(10) Patent No.: US 7,399,522 B2
(45) Date of Patent: Jul. 15, 2008

(54) HEAT-RESISTANT FILTER ELEMENT AND METHOD FOR PRODUCTION THEREOF

(75) Inventors: Koji Nakanishi, Nishitama-gun (JP); Takeshi Hazeyama, Koga (JP)

(73) Assignee: Nittetsu Mining Co., Ltd., Tokyo (JP)

( * ) Notice: Subject to any disclaimer, the term of this patent is extended or adjusted under 35 U.S.C. 154(b) by 0 days.

(21) Appl. No.: 10/493,887

(22) PCT Filed: Oct. 28, 2002

(86) PCT No.: PCT/JP02/11158

§ 371 (c)(1),
(2), (4) Date: Nov. 19, 2004

(87) PCT Pub. No.: WO03/037480

PCT Pub. Date: May 8, 2003

(65) Prior Publication Data

US 2006/0088708 A1    Apr. 27, 2006

(30) Foreign Application Priority Data

Oct. 29, 2001    (JP) .............................. 2001-330642

(51) Int. Cl.
*B32B 27/08*    (2006.01)
*B01D 39/14*    (2006.01)

(52) U.S. Cl. .............. 428/319.3; 428/319.7; 428/317.9; 428/310.5; 55/523; 55/525

(58) Field of Classification Search .............. 428/319.3, 428/319.7, 317.9, 310.5; 55/523, 525
See application file for complete search history.

(56) References Cited

U.S. PATENT DOCUMENTS 3,954,927 A * 5/1976 Duling et al. .................. 264/49

(Continued)

FOREIGN PATENT DOCUMENTS

CA    2051902 A1    3/1992

(Continued)

OTHER PUBLICATIONS

Translation of JP 11-262613, Kobayashi et al, "Filter Element and Method of Backwashing the Same," Sep. 28, 1999.*

(Continued)

*Primary Examiner*—Hai Vo
(74) *Attorney, Agent, or Firm*—Sughrue Mion, PLLC (57) ABSTRACT

A subject for the invention is to provide a low-cost heat-resistant filter element produced from polyethylene particles which is for use in separating and collecting particles from a dust gas, can be continuously used even in a high-temperature environment of about from 70° C. to 130° C., especially from 90° C. to 110° C., is excellent in chemical resistance, and has flexibility and excellent suitability for mass production. Another subject is to provide processes by which the heat-resistant filter element can be produced at a reduced equipment cost while taking care of the environment. In the invention, a coating layer of a fluororesin was formed on a surface of a permeable porous molding obtained from particles of a resin composition containing a polyethylene as a main component of a resin ingredient and from 0.1 to 3 parts by weight of an antioxidant per 100 parts by weight of the resin ingredient by fusion-bonding the particles to one another at the surface thereof.

2 Claims, 4 Drawing Sheets

U.S. PATENT DOCUMENTS

| | | | |
|---|---|---|---|
| 4,539,355 A | * | 9/1985 | Takahashi et al. ............ 524/131 |
| 5,250,593 A | * | 10/1993 | Ishii et al. .................... 524/100 |
| 5,804,074 A | * | 9/1998 | Takiguchi et al. ....... 210/497.01 |
| 6,077,907 A | * | 6/2000 | Raetzsch et al. ............. 525/191 |
| 6,638,610 B1 | * | 10/2003 | Yao .......................... 428/304.4 |

FOREIGN PATENT DOCUMENTS

| | | |
|---|---|---|
| EP | 770714 A1 | 5/1997 |
| JP | 63-205331 | 8/1988 |
| JP | 64-5934 B | 2/1989 |
| JP | 2-39926 B | 9/1990 |
| JP | 4-246445 | 9/1992 |
| JP | 6-179225 | 6/1994 |
| JP | 7-82433 | 3/1995 |
| JP | 8-024536 A | 1/1996 |
| JP | 11-276824 | 10/1999 |
| JP | 11-276824 A | 10/1999 |
| JP | 2000-342916 | 12/2000 |
| JP | 2002-035518 A | 2/2002 |

OTHER PUBLICATIONS

English Translation of JP 05-059227, Ishii et al, "Stabilized Polyolefin Composition", Mar. 9, 1993.*

Tominaga Shigetake, "Fluoroplastic Composition Having Excellent Thermal Stability" (Patent Abstracts of Japan)—JP-A-55-038802.

Supplementary European Search Report dated Dec. 8, 2005.

Edited by Eitaro Oka et al., Plastic Zairyo Koza 4 Polyethylene Jushi, Second edition, The Nikkan Kgyo Shinbun, Ltd., Jun. 30, 1970 pp. 205 to 206.

Edited by the Society of Polymer Science, Japan, Plastic Kako Gijutsu Handbook, first edition, The Nikkan Kogyo Shinbun, Ltd., Jun. 12, 1995, pp. 338 to 339.

International Search Report dated Jan. 14, 2003.

* cited by examiner

HEAT-RESISTANT FILTER ELEMENT AND METHOD FOR PRODUCTION THEREOF

FIELD OF THE INVENTION

The present invention relates to a heat-resistant filter element for separating and collecting fine particles and processes for producing the same.

BACKGROUND ART

Techniques heretofore in use for collecting dusts generating in factories, when the dusts are products or are to be collected, for example, in order to preserve the working environment, employ a bag filter obtained by knitting glass fibers or fibers made of a heat-resistant synthetic resin to obtain a filter fabric and sewing the fabric into a bag, a felt filter fabric, or a self-supporting filter medium, i.e., a filter element, obtained by sintering a ceramic or synthetic resin powder into a permeable porous object. There also are cases where dusts are collected with an electric dust collector.

Filter elements of that type which have been proposed include one produced by sintering a synthetic resin powder into a self-supporting filter element (see JP-B-Hei. 1 (Sho. 64)-5934) and one produced by sintering a powder of polyethylene, polypropylene, or the like and coating a surface of the sinter with polytetrafluoroethylene particles together with an adhesive (see JP-B-Hei. 2-39926).

However, there are cases where the bag filter constituted of a heat-resistant filter fabric leaks dust particles because the weave texture of the fabric is course. On the other hand, the felt fabric is gradually clogged and comes to have increased air-flow resistance, resulting in the necessity of an increased power for the air blower. It further has a drawback that when the dust collected is removed by back washing, the filter fabric may be damaged by friction with the retainer (filter fabric shape retainer). The dust collection with a ceramic sinter or electric dust collector necessitates a high equipment cost because it is expensive.

Furthermore, the filter element obtained by sintering a synthetic resin powder, when the ambient temperature rises to 70 to 90° C. or higher, begins to change in material and becomes difficult to use as a filter, although it undergoes no change in material and withstands use at around ordinary temperature. The heat resistance may be improved by using a heat-resistant resin such as a polysulfone or the like as a synthetic resin powder. However, such a heat-resistant resin is not always sufficient in resistance to chemicals and mechanical strength, and use thereof results in an increased cost because the material itself is expensive.

A first object of the invention is to provide a low-cost heat-resistant filter element produced from polyethylene particles which is for use in separating and collecting particles from a dust gas, can be continuously used even in a high-temperature environment of about from 70° C. to 130° C., especially from 90° C. to 110° C., is excellent in chemical resistance, and has flexibility and excellent suitability for mass production.

A second object of the invention is to provide processes by which the heat-resistant filter element can be produced at a reduced equipment cost while taking care of the environment.

DISCLOSURE OF THE INVENTION

The heat-resistant filter element of the invention and processes of the invention for producing the same have the following constitutions, whereby those objects can be accomplished.

(1) A heat-resistant filter element for separating and collecting particles from a dust gas, comprising:
a permeable porous molding comprising particles of a resin composition in which the particles are fused to one another on the surface thereof, wherein the resin composition comprises a polyethylene as a main component of its resin ingredient and from 0.1 to 3 parts by weight of an antioxidant per 100 parts by weight of the resin ingredient; and
a coating layer of a fluororesin formed on the surface of the permeable porous molding.

(2) A process for producing the heat-resistant filter element according to the above (1), comprising in this order:
(I-1) dispersing a powdered antioxidant in resin particles comprising a polyethylene as a main component,
(I-2) infiltrating the antioxidant into the resin particles comprising a polyethylene as a main component to prepare a particulate resin composition,
(I-3) packing the particulate resin composition into a mold followed by heating to fusion-bond the resin composition particles to one another at the surface thereof to thereby form a permeable porous molding, and
(I-4) forming a coating layer of a fluororesin on the surface of the permeable porous molding formed.

(3) A process for producing the heat-resistant filter element according to the above (1), comprising in this order:
(II-1) dispersing a powdered antioxidant in resin particles comprising a polyethylene as a main component,
(II-2) packing the resin particles comprising the powdered antioxidant dispersed therein into a mold followed by heating to fusion-bond the resin composition particles to one another at the surface thereof to thereby form a permeable porous molding while infiltrating the antioxidant into the resin particles, and
(II-3) forming a coating layer of a fluororesin on the surface of the permeable porous molding formed.

(4) The process for producing a heat-resistant filter element according to the above (2) or (3), wherein the particles of the resin composition have an average particle diameter of from 50 to 500 μm.

(5) The process for producing a heat-resistant filter element according to any one of the above (2) to (4), wherein the antioxidant is at least one antioxidant selected from the group consisting of a phenolic antioxidant, an aromatic amine antioxidant, a sulfur type antioxidant, and a phosphorus type antioxidant.

The heat-resistant filter element of the invention comprises: a permeable porous molding obtained by heating particles of a resin composition comprising polyethylene particles, which have excellent suitability for mass production, as a main component of a resin ingredient and further comprising an antioxidant incorporated therein in a specific proportion to thereby fusion-bond the resin composition particles to one another at the surface thereof; and a coating layer of a fluororesin formed on a surface of the permeable porous molding.

The filter element of the invention, which has such constitution, has improved heat resistance as compared with related-art filter elements employing polyethylene particles. Namely, use of this heat-resistant filter element enables the separation/collection of fine particles to be continuously conducted even in a high-temperature environment of about from 70° C. to 130° C., especially from 90° C. to 110° C. In addition, the filter element is inexpensive.

Furthermore, since the permeable porous molding has a fluororesin layer formed on a surface thereof, the filter element not only has narrowed interstices among particles and can collect fine dust particles as well, but also has satisfactory releasability which enable the dust adherent and accumulated on the element surface to be easily removed by back washing.

BRIEF DESCRIPTION OF THE DRAWINGS

In the drawings, symbol A denotes resin composition particles, B interstices, C a dust, and D fluororesin particles (coating layer), and numeral 10 denotes a dust collector, 12 a casing, and 24 a heat-resistant filer element.

BEST MODE FOR CARRYING OUT THE INVENTION

Modes for carrying out the heat-resistant filter element and processes for producing the same according to the invention will be explained below in detail suitably by reference to the drawings.

First, the materials constituting the heat-resistant filter element are explained. The particles of a resin composition (hereinafter referred to as "resin composition particles") to be used for constituting the heat-resistant filter element of the invention contain a polyethylene as a main component of a resin ingredient.

Examples of the resin ingredient in the resin composition particles include: the case in which the resin ingredient consists of polyethylene particles alone; the case in which the resin ingredient consists of a mixture of polyethylene particles and particles of one or more resins other than polyethylenes; and the case in which the resin ingredient consists of particles of a melt-kneaded mixture of a polyethylene and one or more resins other than polyethylenes. Preferred of these are the case in which the resin ingredient consists of polyethylene particles alone and the case in which the resin ingredient consists of a mixture of polyethylene particles and particles of one or more resins other than polyethylenes.

In the resin ingredient in the resin composition particles, the polyethylene accounts for 50% by weight or more, preferably 65% by weight or more or 100% by weight, of the resin ingredient.

Examples of the polyethylene as a resin ingredient in the resin composition particles include ethylene homopolymers, crystalline copolymers of ethylene and a small amount of one or more α-olefins having 3 to 10 carbon atoms, and the like.

The polyethylene preferably is one which has a viscosity number as measured at 135° C. in decalin solvent of from 300 to 2,500 mL/g. Polyethylenes having a viscosity number within that range include the so-called ultrahigh-molecular polyethylene, which has a weight-average molecular weight Mw exceeding 1,000,000. Particles of ultrahigh-molecular polyethylene or particles of a resin containing ultrahigh-molecular polyethylene retain their particulate shape over long even when heated to a temperature not lower than the melting point thereof in producing a permeable porous molding for use in the filter of the invention, because the flowability thereof is low. Consequently, the permeable porous molding can be easily produced and use of these particles is exceedingly preferred. The value of weight-average molecular weight is one obtained through measurement by gel permeation chromatography and calculation for standard polystyrene.

The polyethylene can be obtained by the polymerization of ethylene or the copolymerization of ethylene and a small amount of one or more α-olefins having 3 to 10 carbon atoms. Polyethylenes in the form of particles or pellets are on the market, and these may be used.

The resin ingredient in the resin composition particles can contain resins other than polyethylenes, such as, e.g., a polypropylene.

Such other resins are mixed in the form of particles with polyethylene particles or are melt-mixed with a polyethylene and pulverized. These resins thus constitute the resin ingredient in the resin composition particles.

In the case where the other resin is a polypropylene, it can be obtained as particles by the polymerization of propylene or the copolymerization of propylene and a small amount of one or more other olefins (e.g., ethylene). Polypropylenes in the form of particles or pellets are on the market, and these may be used.

In the case where the resin composition particles are particles of a melt-kneaded mixture of a polyethylene and at least one resin other than polyethylenes, such resin composition particles having a desired particle diameter can be prepared by mixing the two by melt-kneading and then treating the mixture by mechanical pulverization or the like.

The resin composition particles have an average particle diameter of preferably from 50 to 500 μm, more preferably from 100 to 300 μm. In case where the average particle diameter thereof is smaller than 50 μm, the filter element comes to have a large proportion of clogged areas, resulting in increased air-flow resistance. On the other hand, in case where the average particle diameter thereof is larger than 500 μm, the filter element permits fine dust particles to pass therethrough and has reduced strength.

The resin composition particles contain an antioxidant in an amount of from 0.1 to 3 parts by weight, preferably from 0.5 to 1 part by weight, per 100 parts by weight of the resin ingredient (sum of the polyethylene and the other resins).

Due to the antioxidant contained in an amount within that range, the permeable porous molding constituting the filter element of the invention has improved heat resistance and is continuously usable even in a high-temperature environment of about from 70° C. to 130° C., especially from 90° C. to 110° C. Too low antioxidant contents result in an insufficient improvement in heat resistance, while too high contents result in an increased cost.

Examples of the antioxidant include a phenolic antioxidant, an aromatic amine antioxidant, a sulfur type antioxidant, a phosphorus type antioxidant, and the like. These may be used alone or in combination of two or more thereof.

Specific examples of those antioxidants are as follows. Examples of the phenolic antioxidant include a hindered phenol, a high-molecular hindered phenol, a high-molecular polycyclic hindered phenol, a monoester type high-molecular hindered phenol, a tetraester type high-molecular hindered phenol, a diester type high-molecular hindered phenol, and the like. Examples of the aromatic amine antioxidant include an aralkylated diphenylamine, a phenylenediamine compound, a dihydroquinoline compound, and the like.

Examples of the sulfur compound antioxidant include a tetraester type high-molecular peroxide decomposer, a thioether type peroxide decomposer, and the like. Examples of the phosphorus compound antioxidant include a phosphite, tris(mono- or dinonylphenyl) phosphite, TNP (trisnonylphenyl phosphite), an alkyl allyl phosphite, a trialkyl phosphite, and an allyl phosphite.

Especially preferred of those antioxidants is high-molecular hindered phenol as a phenolic antioxidant.

Incidentally, a phenolic antioxidant especially has the effect of inhibiting radical decomposition deterioration, which is a major cause of synthetic-resin embrittlement by thermal oxidative deterioration. An aromatic amine antioxidant has a prolonged oxygen absorption induction period and excellent oxidation resistance. A sulfur type antioxidant decomposes into inactive compounds to inhibit the embrittlement and discoloration of synthetic resins. When used in combination with, in particular, a phenolic antioxidant, the sulfur type antioxidant comes to have a greatly improved oxidation preventive effect due to the synergistic effect. The phosphorus type antioxidant not only has the effect of preventing oxidative deterioration, but also has the effects of preventing discoloration, improving processing stability, deactivating catalyst residues in resins, etc. For example, in the case where there is a problem concerning coloration caused by a phenolic antioxidant or a problem concerning the offensive odor of a sulfur compound antioxidant, such problems can be easily coped with by using any of those phosphites as a substitute.

Furthermore, the fluororesin serving as the coating layer formed on a surface of the permeable porous molding preferably is polytetrafluoroethylene (PTFE).

Next, processes for producing the heat-resistant filter element of the invention will be explained.

First, a step is conducted in which a given amount of a powdered antioxidant is dispersed in resin particles. For this step is used as ordinary mixing machine for use in dry-blending a resin with additives, such as a tumbling mixer, Henschel mixer, plowshare mixer, or Redige mixer. This step gives a mixture comprising the resin particles and an antioxidant dispersed therein. The antioxidant here may be mixed with the resin particles after having been dissolved in a low-boiling organic solvent such as tetrahydrofuran, methyl ethyl ketone, methyl isobutyl ketone, or acetone. After mixing, the solvent is removed by vaporization.

In one embodiment of the production process of the invention (hereinafter referred to as "first embodiment"), the subsequent step is a step in which the antioxidant dispersed in the resin particles is infiltrated into the resin particles. In this step, the mixture is heated in a vessel to a temperature which is not lower than the melting point where the antioxidant liquefies and is in the range where the resin particles substantially retain their shape, preferably to a temperature not lower than the melting point of the antioxidant and not higher than the melting point of the resin particles. The mixture is held at this temperature for from 15 to 120 minutes, more preferably from 30 to 120 minutes, to infiltrate the antioxidant into the resin particles and thereby prepare a particulate resin composition (resin composition particles). The heating can be conducted, for example, with a heating oven.

Incidentally, melting point in the invention is the temperature at which an endothermic peak is observed with a differential scanning calorimeter (DSC) in heating at a rate of 10° C./min (JIS K7121).

Subsequently, in the first embodiment, a step is conducted in which the resin composition particles comprising resin particles and an antioxidant infiltrated thereinto are packed into a mold and the mold is heated to partly fusion-bond the resin composition particles to one another at the surface thereof to thereby form a permeable porous molding of a united structure. The mold is a mold made of, e.g., a heat-resistant aluminum alloy and has a cavity conforming to the shape of the permeable porous molding. Although this packing operation is usually conducted with vibration, the amplitude and frequency of this vibration are not particularly limited.

The heating is conducted, for example, in a heating oven. The resin composition particles are heated to a temperature which is not lower than the melting point of the polyethylene mainly constituting the resin composition particles, preferably higher than the melting point by 50° C. or more, and is in such a range that the particles substantially retain their shape without flowing throughout the heating. Such a temperature range varies with the kind of the polyethylene, and especially with the molecular weight of the polyethylene. The higher the molecular weight, i.e., the higher the viscosity number, the less the fluidization occurs upon heating to higher temperatures and the more the resin composition particles can retain their shape.

However, the heating temperature is regulated preferably to 250° C. or lower, more preferably to 240° C. or lower. Heating to above 250° C. results in considerable oxidative deterioration of the resin composition particles and makes it difficult to form a permeable porous molding.

The period of heating depends on the viscosity number of the polyethylene and on the heating temperature, and is suitably determined so as to form a satisfactory permeable porous molding. The heat treatment is conducted generally from 1 to 6 hours, preferably from 1.5 to 3 hours.

Through the heat treatment described above, the resin composition particles are partly fusion-bonded to one another at the surface thereof, whereby a united permeable porous molding is formed.

In another embodiment of the production process of the invention (second embodiment), the step in which an antioxidant which has been dispersed in resin particles is infiltrated into the resin particles is not especially conducted. Instead, the mixture prepared by dispersing an antioxidant in resin particles is directly packed into a mold and this mold is heat-treated in a heating oven. Thus, the antioxidant is infiltrated into the resin particles, and the resin composition particles are partly fusion-bonded to one another at surfaces thereof to form a permeable porous molding of a united structure. In this case, in the course of the formation of a permeable porous molding, resin particles into which the antioxidant has not infiltrated undergo fusion-bonding to one another especially in the initial stage. Thereafter, however, the antioxidant infiltrates into the fusion-bonded resin particles. Consequently, at the time of termination of the heat treatment, a permeable porous molding of a united structure is formed which consists of antioxidant-containing resin composition particles partly fusion-bonded to one another at the surface thereof. In this process, the infiltration of the antioxidant is based on the heat applied for the fusion-bonding of the resin composition particles and, hence, a heightened energy efficiency is attained. Incidentally, the temperature and period of the heat treatment in the second embodiment are almost the same as in the first embodiment.

In each of the first embodiment and second embodiment, the mold containing the resultant molding is taken out of the heating oven after heating for a given time period and sufficiently cooled. Thereafter, the molding is taken out of the mold. Thus, a permeable porous molding having sufficient strength and moderate porosity is obtained. The filter element produced has flexibility and high resistance to external forces. Furthermore, when the antioxidant is not added in the form of a solution in, e.g., an organic solvent but added to polyethylene particles by dry dispersion, then the scattering of an organic solvent into the air is avoided and there is no need of using a recovery apparatus. The production process in this case can attain a reduced equipment cost and be environmentally less harmful.

Next, the step in which a coating layer of a fluororesin is formed on a surface of the permeable porous molding formed above, i.e., a surface treatment step, will be explained.

Figure 1:
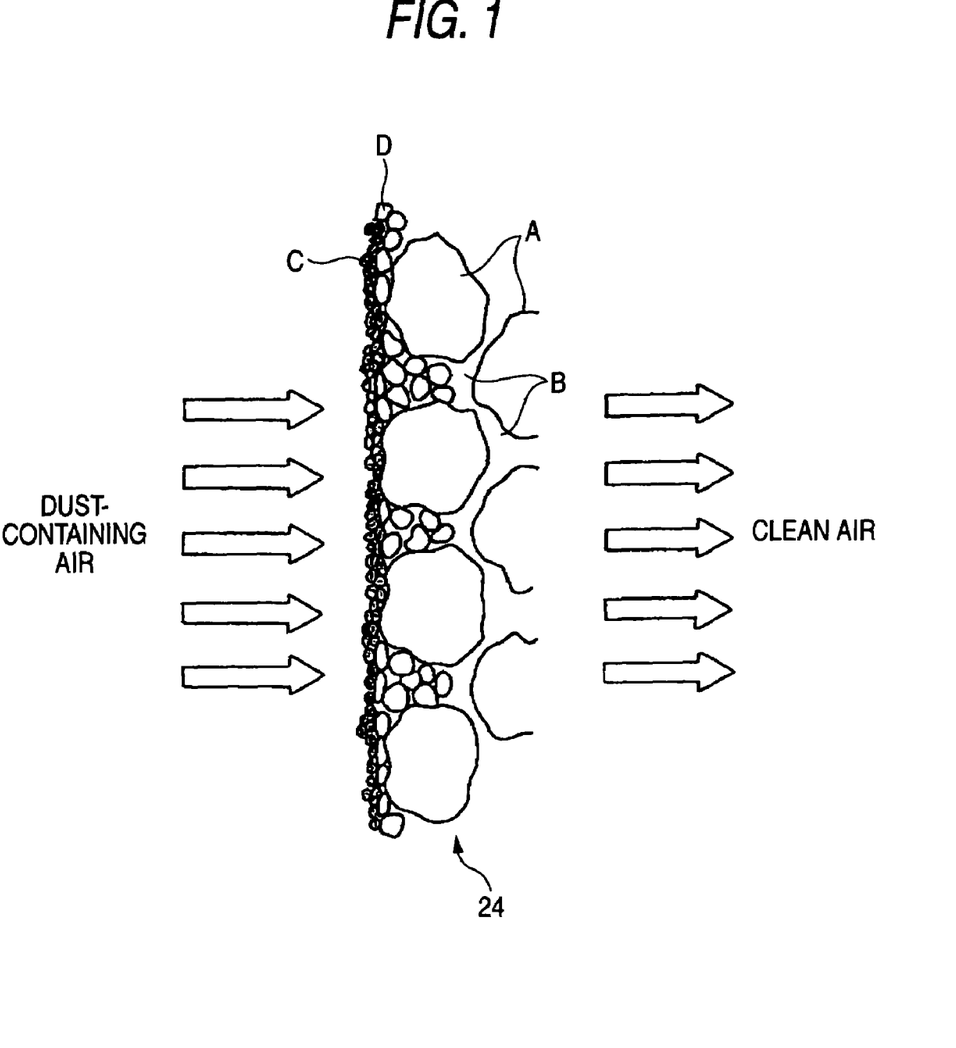
FIG. 1 is a view schematically illustrating a surface of a heat-resistant filter element of the invention.

The permeable porous object obtained above can be used by itself as a filter element. However, as shown in FIG. 1, which schematically illustrates a surface of a heat-resistant filter element according to the invention, the permeable porous object is a coherent mass made up of the resin composition particles A serving as a backbone and there are a large number of relatively large interstices B of from 50 to 500 µm within the permeable porous object.

Because of this, when the permeable porous object is used as a filter, a fine dust C passes therethrough. For preventing this, a layer of fine particles, i.e., a fluororesin coating layer D having interstices of about from 1 to 10 µm, is formed on a surface of the permeable porous object made up of the resin composition particle A. Thus, the filtration efficiency can be improved.

Specifically, polytetrafluoroethylene (PTFE) is especially preferred as the fine fluororesin particles constituting the coating layer. A suspension prepared by mixing fine fluororesin particles with a thermosetting resin as an adhesive and with water is applied by spraying to a surface of the permeable porous object and cured by heating, whereby a coating layer of the fluororesin particles is formed. By thus using fluororesin particles, water repellency is obtained and this brings about satisfactory dust release in back washing and the prevention of dust re-scattering.

The polytetrafluoroethylene particles especially preferred for use as the fluororesin particles are particles of low-molecular polytetrafluoroethylene. The average particle diameter thereof is preferably in the range of from 3 to 10 µm.

Figure 2:
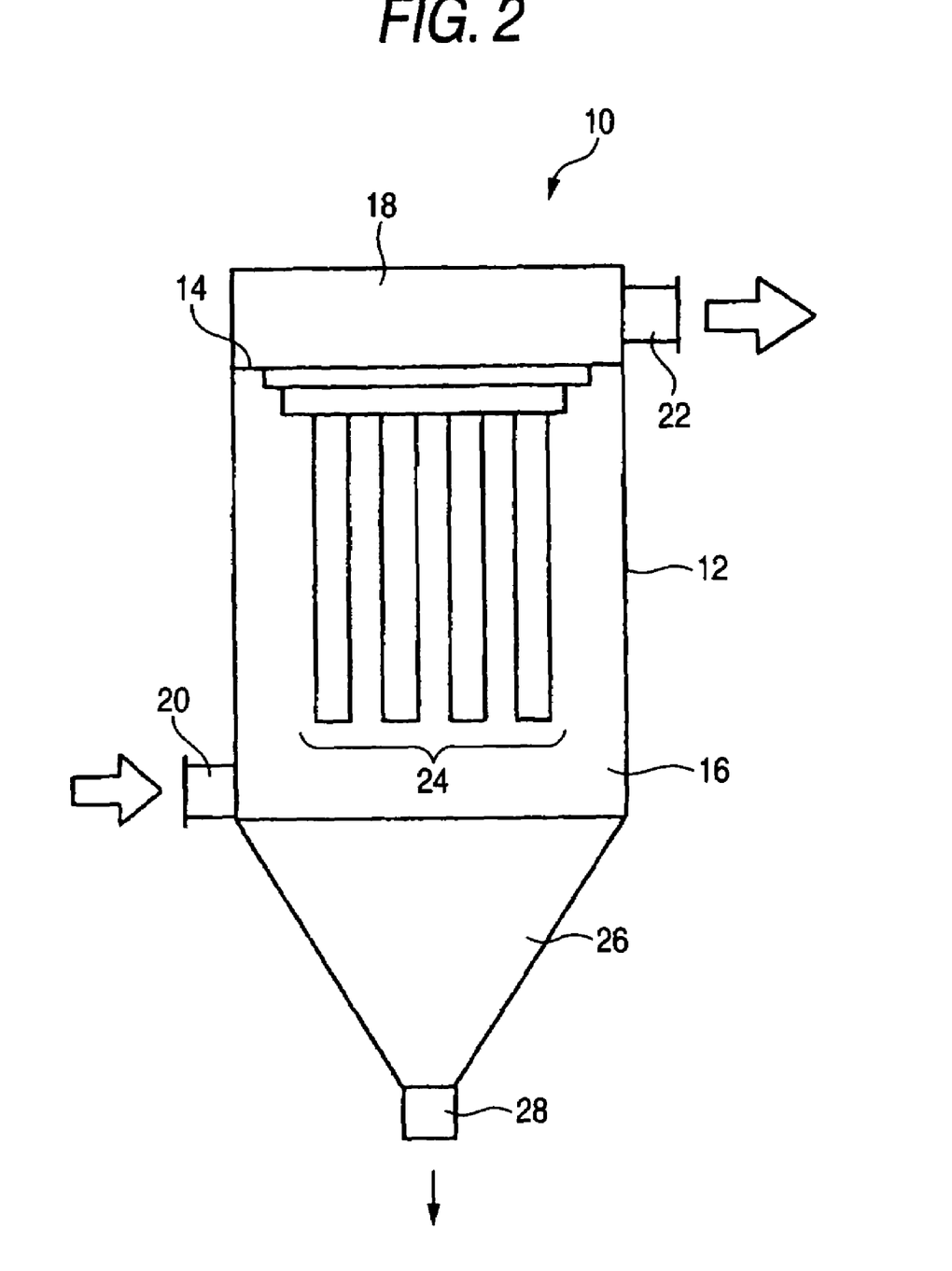
FIG. 2 is a view diagrammatically illustrating the constitution of a dust collector in which heat-resistant filter elements of the invention have been mounted.

In FIG. 2 is diagrammatically shown an example of the constitution of a dust collector in which heat-resistant filter elements produced through the steps described above have been mounted. This dust collector 10 has a closed casing 12, and the inside thereof has been partitioned into a dust collection chamber 16 as a lower part and a clean-air chamber 18 as an upper part with an upper top plate 14 as a partition wall. The casing 12 has, formed in a middle part thereof, a supply opening 20 for dust-containing air which is connected to a lower part of the dust collector chamber 16. The casing 12 further has, formed in an upper part thereof, a clean-air discharge opening 22 which is connected to the clean-air chamber 18. Furthermore, heat-resistant filter elements 24 each in a hollow flat form have been attached at a given interval to the lower side of the upper top plate 14. The casing 12 has, disposed in a lower part thereof, a hopper 26 for discharging the dust removed and a discharge opening 28 for discharging the dust.

Figure 3:
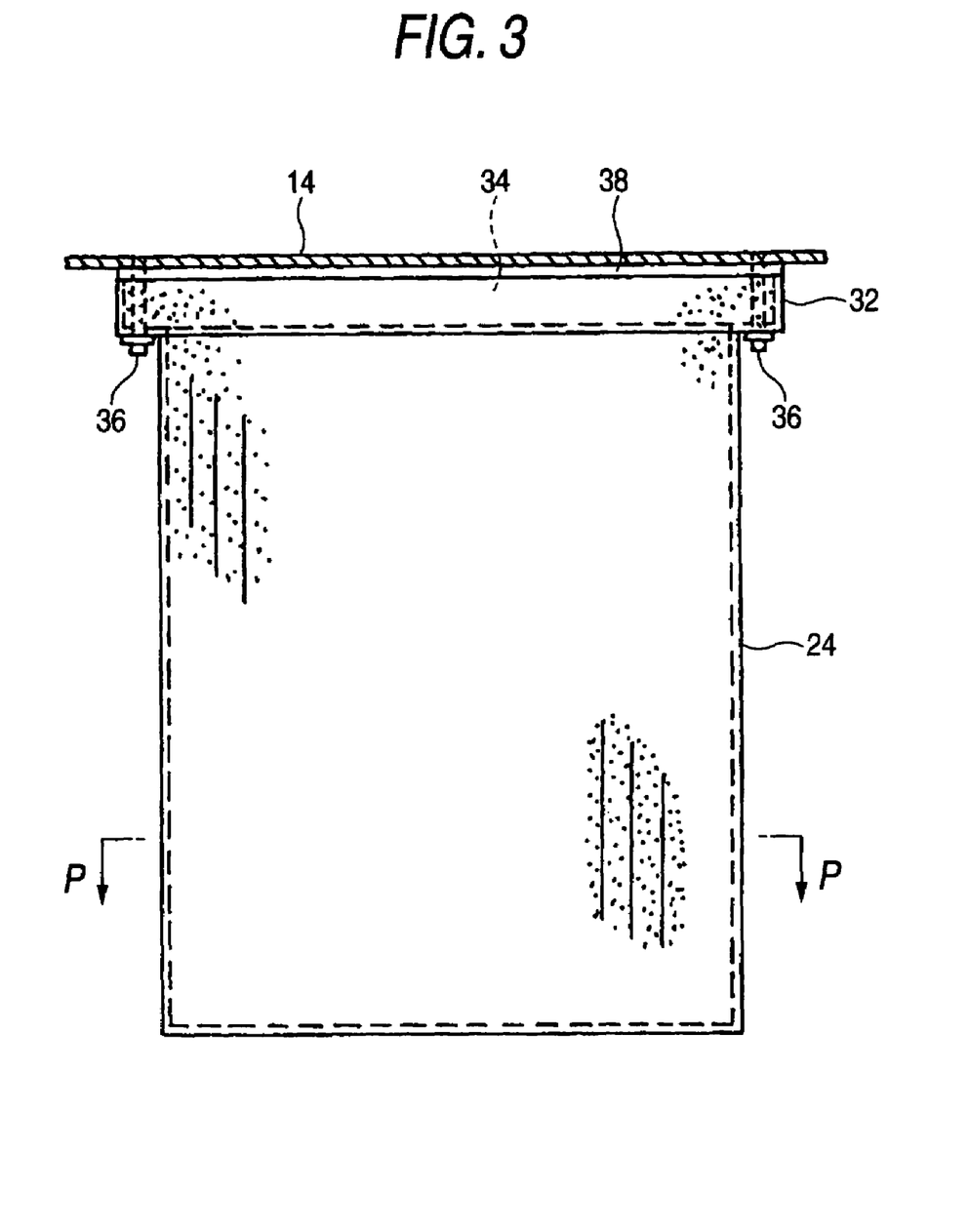
FIG. 3 is a view diagrammatically illustrating the appearance of a heat-resistant filter element of the invention.

The heat-resistant filter elements 24 each has an attachment part 32 at the upper end thereof and the attachment part 32 has an expanded shape so that a frame 34 is fitted therein, as shown in FIG. 3, which diagrammatically illustrates the appearance of the filter element 24. Both ends of the frame 34 fitted in the attachment part 32 have been attached to the upper top plate 14 through fastening bolts 36 in such a manner as to be united with the attachment part 32. A packing 38 has been interposed between the upper top plate 14 and the frame 34.

Figure 4:
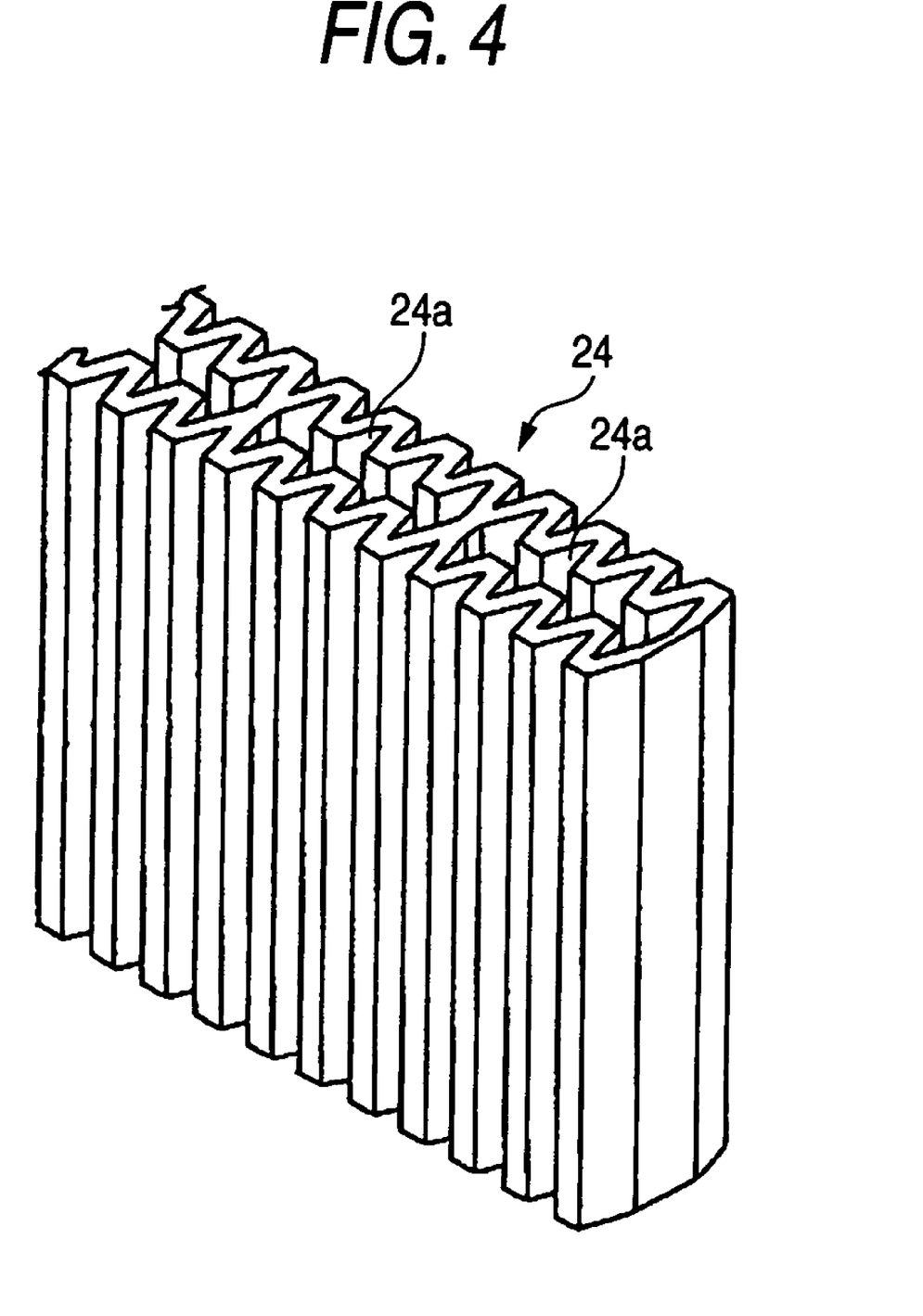
FIG. 4 is a slant view of the section P-P of the heat-resistant filter element shown in FIG. 3.

As shown in FIG. 4, which is a slant view of the section P-P of the heat-resistant filter element 24 of FIG. 3, the inside of the filter element 24 has hollow chambers 24a each having an open upper end. The dust adhesion surface of the element has a corrugated shape or bellows shape so as to have an increased adhesion area.

Dust-containing air supplied through the supply opening 20 to the dust collection chamber 16 of the casing 12 passes through the filter medium of the hollow heat-resistant filter elements 24 and flows inside. The dust here adheres and accumulates on the surface of the heat-resistant filter elements 24 and is collected, while the clean air which has flowed inside the heat-resistant filter elements 24 passes through the passage in each frame 34, enters the clean air chamber 18 located in an upper part of the casing 12, and is introduced into a given place through the discharge opening 22 therefor.

When a dust adheres to and accumulates on the surface of each heat-resistant filter element 24, air passages are clogged and the pressure loss increases. Consequently, the heat-resistant filter elements 24 are successively back-washed at a given time internal to remove the dust which has adhered to and accumulated on the surfaces of the heat-resistant filter elements 24. Namely, back-washing valves not shown are successively opened and closed at a given interval by, e.g., timer control to eject pulse air for back washing from corresponding ejection tubes. Thus, the pulse air flows through each heat-resistant filter element 24 backward, i.e., from inside to outside, whereby the dust which has adhered to and accumulated on the surface of each heat-resistant filter element 24 is removed in the accumulated state without scattering. The dust thus removed is recovered through the hopper 26 and the discharge opening 28.

The heat-resistant filter element produced through the heat treatment and coating with fluororesin particles as described above can be formed so as to have a cylindrical shape or box shape or to have a box shave with a corrugated section so as to have an increased surface area.

EXAMPLES

The invention will be explained below in detail based on Examples. However, the invention should not be construed as being limited to the following Examples.

The resin particles used in the Examples and Comparative Examples are as follows.

Polyethylene particles (A) (PE particles (A))
Average particle diameter=200 µm (determined by sieving method)
Melting point=135° C.
Polyethylene particles (B) (PE particles (B))
Average particle diameter=150 µm
Melting point=135° C.
Polyethylene particles (C) (PE particles (C))
Average particle diameter=300 µm
Melting point=125° C.
Polypropylene particles (PP particles (A))
Average particle diameter=200 µm
Melting point=170° C.

Example 1

Fifty parts by weight of PE particles (A) and 50 parts by weight of PP particles (A) were mixed with a solution prepared by dissolving 3 parts by weight of an antioxidant (phenolic antioxidant; high-molecular hindered phenol) in 9 parts by weight of tetrahydrofuran, by means of a Henschel mixer.

Thus, a mixture comprising PE particles (A) and the antioxidant dispersed therein was prepared.

This mixture was introduced into a stainless-steel vessel. In a nitrogen atmosphere, the contents were heated to 120° C. with an oil bath and held at this temperature for 2 hours. Thus, resin composition particles in which the antioxidant had infiltrated into the resin particles were prepared.

The resin composition particles prepared above were packed into a mold (external dimensions: 20 mm×60 mm, thickness: 3 mm) for test pieces. This mold was held at a temperature of 200° C. for 10 minutes while applying a pressure thereto. Thus, sheet-form solid moldings were obtained. It had been found that the resin composition particles give a permeable porous molding having the same properties as the sheet-form solid moldings.

Eighteen of the sheet-form solid moldings produced above were placed in a 190° C. oven. At 24 hours, 48 hours, and 72 hours thereafter, six sheets were taken out at each time. The number of sheets which broke upon bending at the center at an angle of 180° was determined. The sheets were visually examined for discoloration and any change in shape. The results thereof are shown in Table 1.

Furthermore, the retention of weight after 72 hours was calculated using the following mathematical expression (1), and is shown in Table 1. The lower the retention of weight, the poorer the heat resistance.

Mathematical expression (1):

Retention of weight (%)=[(weight after 72 hours)/(initial weight)]×100

In addition, overall heat resistance was evaluated in the following three grades, and is shown in Table 1.

A: excellent
B: insufficient
C: poor

Example 2 and Comparative Examples 1 to 3

Sheet-form solid moldings were produced in the same manner as in Example 1, except that the resin particles and antioxidants shown in Table 1 were used in the proportions shown in Table 1. The solid moldings produced were examined for heat resistance. The results thereof are shown in Table 1.

TABLE 1

| | Kind of particles and proportion (parts by weight) | Antioxidant (parts by weight) | After 24 hours | | |
|---|---|---|---|---|---|
| | | | Bending test (number of broken sheets) | Discoloration | Shape |
| Ex. 1 | PE(A) (50) PP(A) (50) | phenolic (high-molecular hindered phenol) (3) | 0 | white, translucent | surface irregularities |
| Ex. 2 | PE(A) (50) PP(A) (50) | phenol (hindered phenol) & sulfur compound (tetraester type high-molecular peroxide decomposer) (3 in total) | 0 | light yellow, translucent | surface irregularities |
| Comp. Ex. 1 | PE(A) (100) | none | 0 | amber | shrinkage, deformation |
| Comp. Ex. 2 | PE(A) (50) PP(A) (50) | none | 6 | amber | craters |
| Comp. Ex. 3 | PE(A) (50) PE(B) (25) PE(C) (25) | none | 0 | glossy black | shrinkage, deformation |

| | After 48 hours | | | After 72 hours | | | | |
|---|---|---|---|---|---|---|---|---|
| | Bending test (number of broken sheets) | Discoloration | Shape | Bending test (number of broken sheets) | Discoloration | Shape | Retention of weight (%) | Evaluation |
| Ex. 1 | 0 | white, translucent | surface irregularities | 0 | white, translucent | surface irregularities | 100.9 | A |
| Ex. 2 | 0 | light yellow, translucent | surface irregularities | 0 | light yellow, translucent | surface irregularities | 101.8 | A |
| Comp. Ex. 1 | 0 | dark amber | shrinkage, deformation | 0 | dark amber | shrinkage, deformation | 101.3 | B |
| Comp. Ex. 2 | 6 | partly dark amber | craters | 6 | Dark amber | many craters | 70.2 | C |
| Comp. Ex. 3 | 0 | glossy black | shrinkage, deformation | 0 | glossy black | shrinkage, deformation | 98.3 | B |

The results given in Table 1 show that the solid moldings (including permeable porous moldings) specified in the invention retain the original shape even after aging, undergo no discoloration, and have excellent heat resistance.

Examples 3 to 7 and Comparative Examples 4 to 6

The resin particles and antioxidant (phenolic antioxidant; high-molecular hindered phenol) shown in Table 2 were mixed with each other in the proportions shown in Table 2 by means of a Henschel mixer, provided that the antioxidant was added as a 25% by weight solution in tetrahydrofuran. Thus, a mixture comprising the resin particles and the antioxidant dispersed therein was prepared.

This mixture was introduced into a stainless-steel vessel. In a nitrogen atmosphere, the contents were heated to 120° C.

with an oil bath and held at this temperature for 2 hours. Thus, resin composition particles in which the antioxidant had infiltrated into the resin particles were prepared.

The resin composition particles obtained were packed into a mold (external dimensions: 10 mm×130 mm, thickness: 3 mm) for test pieces. This mold was placed in a heating oven and heated under the heating conditions shown in Table 2. Thus, permeable porous moldings in a sheet form were obtained.

The sheet-form permeable porous moldings obtained were allowed to stand in an oven having a temperature of 190° C. for 72 hours. The moldings were examined for tensile strength (MPa) and elongation (%) in accordance with JIS K7113 before and after the standing, and visually examined for any change in appearance. In addition, overall heat resistance was evaluated in the following four grades. Incidentally, the heat resistance test conducted at a temperature of 190° C. for 72 hours corresponds to a heat resistance test at 100° C. for 40,000 hours (The test here was conducted based on the simple life estimation method in which a temperature increase of about 10° C. is assumed to result in a decrease in life by half.).

A: highly excellent
B: excellent
C: insufficient
D: poor

The results are shown in Table 2.

with vibration. Subsequently, this mold was placed in a heating oven and heat-treated at an oven temperature of 240° C. for 3 hours (180 minutes).

After termination of the heat treatment, the mold was cooled to 100° C. in the heating oven and then taken out of the oven. While this mold was being cooled with a cooling fan, the resultant permeable porous molding was taken out of the mold.

Subsequently, a suspension prepared by mixing a polytetrafluoroethylene powder (average particle diameter, 7 μm) with a thermosetting adhesive, methanol, and water was sufficiently homogenized by stirring and applied to a surface of the permeable porous molding by spraying. Thereafter, the coated molding was placed in a dryer and heated at 180° C. for 30 minutes to cure the coating. Thus, a heat-resistant film element having a weight of 18 kg was obtained.

This heat-resistant filter element was attached to a loading tester, and a loading test was conducted under the following conditions.

Temperature: 100° C.
Air filtration speed: 1 m/min
Back washing pulse conditions:
Pressure, 0.44 MPa
Ejection time, 0.2 sec
Ejection interval, 12 sec (corresponding to a 10-fold accelerated test because the ordinary ejection interval is 120 seconds)

TABLE 2

|  | Kind of particles and proportion (parts by weight) | Antioxidant (parts by weight) | Heating condition | Tensile strength [MPa] Before aging → after aging | Elongation [%] Before aging → after aging | Appearance | Evaluation |
|---|---|---|---|---|---|---|---|
| Ex. 3 | PE(A) (50) PE(B) (25) PE(C) (25) | high-molecular hindered phenol (1.0) | 240° C. 2 hr | 4.5 → 5.6 | 36.7 → 37.4 | original shape retained, no discoloration | A |
| Ex. 4 | PE(A) (100) | high-molecular hindered phenol (1.0) | 240° C. 2 hr | 4.7 → 5.8 | 76.3 → 105.3 | original shape retained, no discoloration | A |
| Ex. 5 | PE(A) (50) PP(A) (50) | high-molecular hindered phenol (1.0) | 170° C. 2 hr | 1.4 → — | 1.1 → — | partial melting, no discoloration | B |
| Ex. 6 | PE(A) (50) PP(A) (50) | high-molecular hindered phenol (1.5) | 170° C. 2 hr | 1.7 → — | 1.5 → — | partial melting, no discoloration | B |
| Ex. 7 | PE(A) (50) PP(A) (50) | high-molecular hindered phenol (1.0) | 170° C. 2 hr | 2.6 → — | 2.3 → — | partial melting, no discoloration | B |
| Comp. Ex. 4 | PE(A) (50) PP(A) (50) | high-molecular hindered phenol (0.5) | 170° C. 2 hr | 1.8 → — | 1.3 → — | partial melting, partial discoloration | C |
| Comp. Ex. 5 | PE(A) (50) PP(A) (50) | none | 170° C. 2 hr | 1.9 → — | 1.5 → — | melting, shrinkage, discoloration | D |
| Comp. Ex. 6 | PE(A) (50) PE(B) (25) PE(C) (25) | none | 240° C. 2 hr | 4.1 → — | 30.7 → — | melting, shrinkage, discoloration | D |

It is apparent from the results given in Table 2 that the permeable porous objects produced from resin composition particles containing an antioxidant in an amount within the range specified in the invention have excellent heat resistance.

Example 8

The resin composition particles prepared in Example 1 in which an antioxidant had infiltrated into resin particles were packed into a mold (external dimensions: 1,050 mm×960 mm×60 mm, thickness: 3 mm, sectional shape: corrugated)

Powder: calcium carbonate (average particle diameter=11 μm), concentration, 5 g/m$^3$ The loading test was continuously performed for consecutive 1,200 hours (50 days), and the pressure loss was determined with a manometer from a pressure difference between the inlet and outlet of the filter element. As a result, a value not exceeding the allowable range of 180 daPa was obtained. Furthermore, the amount of dust on the outlet side was measured with a digital dust meter (manufactured by Shibata Kagaku Kiki Kogyo). As a result, the filter element showed satisfactory filtering performance with a dust amount of 0.1 mg/m$^3$ or smaller. No damage was observed in the filter element, and it could be ascertained that the filter element had a life of 12,000 hours (corresponding to about 1 year and 5 months in continuous operation under load) or longer.

This application is based on a Japanese patent application filed on Oct. 29, 2001 (Application No. 2001-330642), the contents thereof being herein incorporated by reference.

INDUSTRIAL APPLICABILITY

The heat-resistant filter element of the invention comprises: a permeable porous molding obtained by heating resin composition particles containing a polyethylene, which has excellent suitability for mass production, as the main component of a resin ingredient and further containing an antioxidant incorporated in a specific proportion to thereby fusion-bond the resin composition particles to one another at the surface thereof; and a coating layer of a fluororesin formed on the surface of the molding.

The heat-resistant filter element of the invention, which has such constitution, has improved heat resistance as compared with related-art filter elements employing polyethylene particles. Namely, use of this heat-resistant filter element enables the separation and collection of fine particles to be continuously conducted even in a high-temperature environment of about from 70° C. to 130° C., especially from 90° C. to 110° C. The filter element has excellent chemical resistance and flexibility, and is highly suitable for mass production and provided at low cost.

Furthermore, since the permeable porous object has a fluororesin layer formed on a surface thereof, sufficient strength and air permeability are secured and the fine particles adhered to and accumulated on the element surface can be satisfactorily removed by back washing.

Moreover, according to the production processes of the invention, the heat-resistant filter element can be produced at a reduced equipment cost while taking care of the environment.

The invention claimed is:

1. A heat-resistant filter element for separating and collecting particles from a dust gas, comprising:
    a permeable porous molding comprising particles of a resin composition in which the particles are fused to one another on the surface thereof, said fused portion including an antioxidant, wherein the resin particles have a fused surface portion and an unfused inner portion, said antioxidant being present in higher concentration in said fused portion than in said unfused portion, wherein the resin composition comprises a polyethylene as a main component of its resin ingredient and from 0.5 to 3 parts by weight of the antioxidant per 100 parts by weight of the resin ingredient; and
    a coating layer of a fluororesin formed on the surface of the permeable porous molding, said heat-resistant filter element prepared by:
    (I-1) dispersing a powdered antioxidant in resin particles comprising a polyethylene as a main component,
    (I-2) infiltrating the antioxidant into the resin particles comprising a polyethylene as a main component by heating to a temperature which is not lower than the melting point where the antioxidant liquefies and is in the range where the resin particles substantially retain their shape to prepare a particulate resin composition,
    (I-3) packing the particulate resin composition into a mold followed by heating to fusion-bond the resin composition particles to one another at the surface thereof to thereby form a permeable porous molding, and
    (I-4) forming a coating layer of a fluororesin on the surface of the permeable porous molding formed.

2. A heat-resistant filter element for separating and collecting particles from a dust gas, comprising:
    a permeable porous molding comprising particles of a resin composition in which the particles are fused to one another on the surface thereof, said fused portion including an antioxidant, wherein the resin particles have a fused surface portion and an unfused inner portion, said antioxidant being present in higher concentration in said fused portion than in said unfused portion, wherein the resin composition comprises a polyethylene as a main component of its resin ingredient and from 0.5 to 3 parts by weight of the antioxidant per 100 parts by weight of the resin ingredient; and
    a coating layer of a fluororesin formed on the surface of the permeable porous molding, said heat-resistant filter element prepared by:
    (II-1) dispersing a powdered antioxidant in resin particles comprising a polyethylene as a main component,
    (II-2) packing the resin particles comprising the powdered antioxidant dispersed therein into a mold followed by heating to fusion-bond the resin composition particles to one another at the surface thereof to thereby form a permeable porous molding while infiltrating the antioxidant into the resin particles, and
    (II-3) forming a coating layer of a fluororesin on the surface of the permeable porous molding formed.

* * * * *